US008990577B2

(12) United States Patent
    Sathath

(10) Patent No.: US 8,990,577 B2
(45) Date of Patent: Mar. 24, 2015

(54) INFORMATION PROCESSING APPARATUS AND DATA PROTECTION METHOD

(75) Inventor: Anwar Sathath, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 716 days.

(21) Appl. No.: 13/271,954

(22) Filed: Oct. 12, 2011

(65) Prior Publication Data

US 2012/0254623 A1    Oct. 4, 2012

(30) Foreign Application Priority Data

Mar. 31, 2011    (JP) .................................. 2011-080103

(51) Int. Cl.
    *G06F 21/00*    (2013.01)
    *G06F 21/60*    (2013.01)
    (Continued)

(52) U.S. Cl.
    CPC .............. *G06F 21/602* (2013.01); *G06F 21/78* (2013.01); *G06F 2221/2105* (2013.01); *G06F 21/62* (2013.01); *G06F 2221/2143* (2013.01)
    USPC .............. 713/183; 713/324; 726/28; 711/164

(58) Field of Classification Search
    CPC ... G06F 1/3203; G06F 1/3206; G06F 1/3231; G06F 1/3278; G06F 1/3287; G06F 21/00; G06F 21/30; G06F 21/31; G06F 21/50; G06F 21/60; G06F 21/602; G06F 21/62; G06F 21/6209; G06F 21/6218; G06F 21/70; G06F 21/78; G06F 21/81; G06F 2221/2105; G06F 2221/2129; G06F 2221/2139; G06F 2221/2143; G06F 9/5094; Y02B 60/1289; G11B 20/00253; G11B 20/00673
    USPC ................. 713/182–183, 189, 193, 300, 320, 713/323–324; 726/2, 16–19, 26–28, 33; 380/247, 249, 277; 708/135; 711/164
    See application file for complete search history.

(56) References Cited

U.S. PATENT DOCUMENTS 8,112,601 B2 *  2/2012 Al-Azzawi .................... 711/163
8,555,083 B1 * 10/2013 Nanda et al. .................. 713/189
(Continued)

FOREIGN PATENT DOCUMENTS

JP    2000-183867    6/2000
JP    2008-269120    11/2008
(Continued)

OTHER PUBLICATIONS

Perenson, Melissa "Self-Encrypted Drives Set to Become Standard Fare" [Online], Jan. 5, 2011 [Retrieved on: Jun. 10, 2014], www.pcworld.com, Retrieved from: <http://www.pcworld.com/article/215681/self_encrypted_hard_drives_to_become_standard_fare.html>.*

(Continued)

*Primary Examiner* — Saleh Najjar
*Assistant Examiner* — Eric W Shepperd
(74) *Attorney, Agent, or Firm* — Blakely, Sokoloff, Taylor & Zafman LLP

(57) ABSTRACT

According to an embodiment, an information processing apparatus includes a first storage unit, a second storage unit, a power supply state control unit, a cryptographic key movement unit, a communications unit, an information input determination unit, a communications state determination unit, and a cryptographic key control unit. The cryptographic key movement unit is configured to move at least part of the cryptographic key data stored in the first storage unit to the second storage unit before a shift from a power-on state to another power supply state. In the other power supply state, the cryptographic key control unit returns the cryptographic key data from the second storage unit to the first storage unit if it is determined that there is an input of information which matches the information stored in the second storage unit and it is determined that communications are enabled between the communications unit and a base-station apparatus.

4 Claims, 3 Drawing Sheets

(51) Int. Cl.
*G06F 21/78* (2013.01)
*G06F 21/62* (2013.01)

(56) References Cited

U.S. PATENT DOCUMENTS

| | | | |
|---|---|---|---|
| 2002/0073306 A1* | 6/2002 | Aluzzo et al. | 713/1 |
| 2003/0074566 A1* | 4/2003 | Hypponen | 713/183 |
| 2003/0097596 A1* | 5/2003 | Muratov et al. | 713/202 |
| 2004/0003190 A1* | 1/2004 | Childs et al. | 711/163 |
| 2005/0005131 A1* | 1/2005 | Yoshida et al. | 713/183 |
| 2005/0044433 A1* | 2/2005 | Dunstan | 713/320 |
| 2005/0066158 A1* | 3/2005 | Mowery et al. | 713/2 |
| 2005/0262341 A1* | 11/2005 | Field | 713/165 |
| 2008/0222423 A1* | 9/2008 | Rodriguez et al. | 713/182 |
| 2009/0052745 A2* | 2/2009 | Sathath | 382/115 |
| 2009/0112884 A1* | 4/2009 | Sathath et al. | 707/10 |
| 2009/0240958 A1* | 9/2009 | Adams et al. | 713/193 |
| 2009/0271619 A1 | 10/2009 | Fujii et al. | |
| 2010/0037076 A1* | 2/2010 | Reece et al. | 713/324 |
| 2010/0120406 A1* | 5/2010 | Banga et al. | 455/418 |
| 2010/0174934 A1* | 7/2010 | Zhao et al. | 713/324 |
| 2010/0266132 A1* | 10/2010 | Bablani et al. | 380/286 |
| 2011/0087896 A1* | 4/2011 | Thom et al. | 713/193 |
| 2011/0154032 A1* | 6/2011 | Mauro, II | 713/165 |
| 2011/0154060 A1* | 6/2011 | Guyot et al. | 713/193 |
| 2011/0185186 A1* | 7/2011 | Adams et al. | 713/189 |
| 2011/0252243 A1* | 10/2011 | Brouwer et al. | 713/189 |
| 2011/0258456 A1* | 10/2011 | Lyakhovitskiy | 713/189 |
| 2012/0025978 A1* | 2/2012 | Ferren et al. | 340/539.13 |
| 2012/0137140 A1* | 5/2012 | Berengoltz et al. | 713/189 |
| 2012/0151223 A1* | 6/2012 | Conde Marques et al. | 713/193 |
| 2012/0239939 A1* | 9/2012 | Seethaler et al. | 713/186 |

FOREIGN PATENT DOCUMENTS

| | | |
|---|---|---|
| JP | 2008-269232 | 11/2008 |
| JP | 2008-269285 | 11/2008 |

OTHER PUBLICATIONS

Jun et al. "Trusted Full Disk Encryption Model Based on TPM" [Online], Dec. 6, 2010 [Retrieved on: Jun. 13, 2014], 2nd International Conference on Information Science and Engineering (ICISE), pp. 1-4, Retrieved from: <http://ieeexplore.ieee.org/stamp/stamp.jsp?tp=&arnumber=5689500>.*

* cited by examiner

INFORMATION PROCESSING APPARATUS AND DATA PROTECTION METHOD

CROSS-REFERENCE TO RELATED APPLICATION

This application is based upon and claims the benefit of priority from Japanese Patent Application No. 2011-080103, filed in Japan on Mar. 31, 2011; the entire contents of which are incorporated herein by reference.

FIELD

An embodiment described herein relates generally to an information processing apparatus and a data protection method.

BACKGROUND

Conventionally, a technique in which the encryption key, used to encrypt the storage device such as HDD (Hard disk drive) on the PC (personal computer), has been deleted remotely via data communication to protect the data when the PC has been lost.

However, with conventional techniques such as the one described above, if, for example, the PC is transferred to a location where data communications are unavailable or the storage device such as an HDD is removed from the PC, there is a problem that it is difficult to prevent data leakage.

DETAILED DESCRIPTION

According to an embodiment, an information processing apparatus includes a first storage unit, a second storage unit, a power supply state control unit, a cryptographic key movement unit, a communications unit, an information input determination unit, a communications state determination unit, and a cryptographic key control unit. The first storage unit is configured to prestore an operating system and subjected to an encryption process in advance using cryptographic key data. The second storage unit is configured to prestore identification data including information used to identify users allowed to access the first storage unit. The power supply state control unit is configured to perform control to shift a power supply state to one of a power-on state in which the operating system is running and another power supply state different from the power-on state. The cryptographic key movement unit is configured to move at least part of the cryptographic key data stored in the first storage unit to the second storage unit before the power supply state control unit shifts from the power-on state to the other power supply state. The communications unit is configured to be able to conduct wireless communications with a base-station apparatus installed outside the cryptographic key movement unit. The information input determination unit is configured to determine in the other power supply state whether or not there is an input of information which matches the information included in the identification data stored in the second storage unit. The communications state determination unit is configured to determine in the other power supply state whether or not communications are enabled between the communications unit and the base-station apparatus. The cryptographic key control unit is configured to return the cryptographic key data from the second storage unit to the first storage unit if the information input determination unit determines that there is an input of information which matches the information included in the identification data stored in the second storage unit and the communications state determination unit determines that communications are enabled between the communications unit and the base-station apparatus.

The embodiment will be described below with reference to the drawings.

Figure 1:
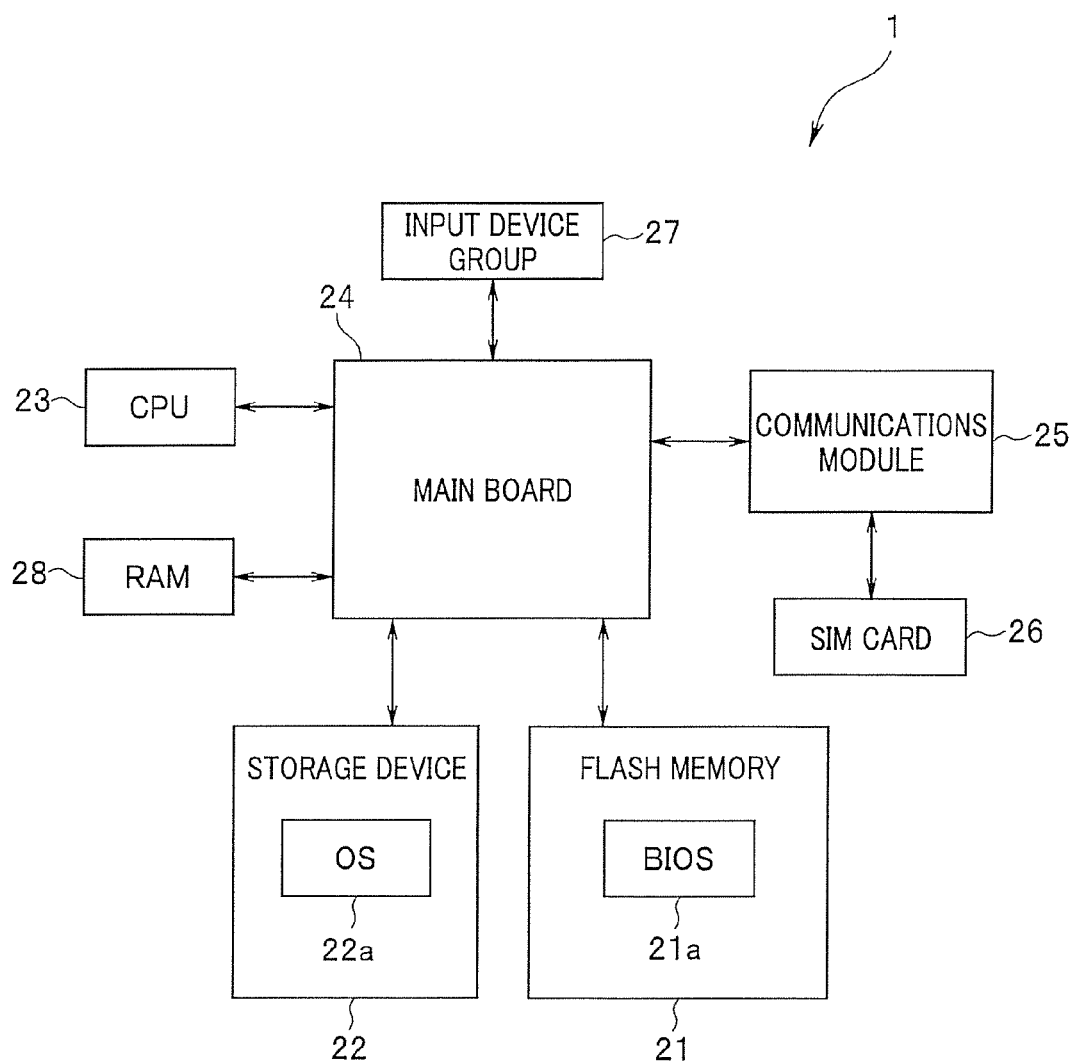
FIG. 1 is a diagram showing principal parts of an information processing apparatus according to an embodiment.

FIG. 1 is a diagram showing principal parts of an information processing apparatus according to the embodiment.

As shown in FIG. 1, an information processing apparatus 1 configured as a PC (personal computer) includes a flash memory 21, a storage device 22, a CPU 23, a main board 24, a communications module 25, a SIM card 26, an input device group 27, and a RAM 28. As shown in FIG. 1, the flash memory 21, the storage device 22, the CPU 23, the communications module 25, the input device group 27, and the RAM 28 are interconnected via the main board 24. Furthermore, as shown in FIG. 1, the SIM card 26 is connected to the main board 24 via the communications module 25.

The flash memory 21 prestores a BIOS (Basic Input/Output System) 21a provided with a program group used to control input/output operations of signals (data) among various portions of the information processing apparatus 1, telephone number data contained in the identification data used to identify the users allowed to access the storage device 22, and password data used for processing described later.

The storage device 22 made up of a HDD (hard disk drive) or a SSD (solid-state drive) prestores an OS (Operating System) 22a provided with a program group used to control operations of basic functions of the information processing apparatus 1 in an integrated manner as well as various data including password data used for processing described later.

Upon power-up of the information processing apparatus 1, the CPU 23 reads the BIOS 21a from the flash memory 21 and operates the main board 24 so as to input and output signals (data) based on the read BIOS 21a. Also, with the main board 24 operating based on the BIOS 21a read out of the flash memory 21, the CPU 23 further activates the OS 22a stored in the storage device 22 and thereby performs control over the operations of the basic functions of the information processing apparatus 1.

On the other hand, the CPU 23 functioning as the power supply state control unit performs control, based on manipulations of the input device group 27 and the like, for example, to power on and off the information processing apparatus 1, turn on and off a suspend function of the information processing apparatus 1, and turn on and off a hibernation function of the information processing apparatus 1.

If the suspend function of the information processing apparatus 1 is turned on in a power-on state, data being processed just before the suspend function is switched from off to on is stored in the RAM 28 and the information processing apparatus 1 shifts to a suspended state in which driving power is supplied only to minimum necessary parts of the information processing apparatus 1 including the RAM 28. Subsequently, when the suspend function of the information processing apparatus 1 is switched from on to off in the suspended state, processing of the data stored in the RAM 28 is resumed and power supply to various parts of the information processing apparatus 1 is restarted, and consequently the information processing apparatus 1 shifts to a power-on state.

On the other hand, if the hibernation function of the information processing apparatus 1 is turned on in a power-on state, data being processed just before the hibernation function is switched from off to on is stored in the storage device 22 and the information processing apparatus 1 shifts to a hibernation state in which the driving power stops being supplied to various parts of the information processing apparatus 1. Subsequently, when the hibernation function of the information processing apparatus 1 is switched from on to off in the hibernation state, processing of the data stored in the storage device 22 is resumed and power supply to various parts of the information processing apparatus 1 is restarted, and consequently the information processing apparatus 1 shifts to a power-on state.

The main board 24 is equipped with various interfaces used for the input/output operations of the signals (data) among various portions of the information processing apparatus 1.

The communications module 25 is equipped, for example, with an antenna and 3 G communications module and is attachable/detachable to/from an expansion slot (not shown) of the main board 24. Also, the communications module 25 is configured to be able to conduct wireless communications with a base-station apparatus (not shown) installed outside the information processing apparatus 1 (or the CPU 23).

The SIM card 26 is configured to be attachable/detachable to/from the communications module 25. The SIM card 26 has telephone number data written in advance, where the telephone number data is unique to each SIM card 26.

The input device group 27 includes a keyboard and pointing device and is configured to be a user interface which allows the user to manipulate various functions of the information processing apparatus 1.

Now, concrete operations of the information processing apparatus 1 with the above configuration will be described. It is assumed hereinafter that the storage device 22 has already been subjected to an encryption process, meaning that N-bit cryptographic key data used for the encryption process has been generated, and that data in the storage device 22 can be accessed by returning the N-bit cryptographic key data to the storage device 22.

Figure 2:
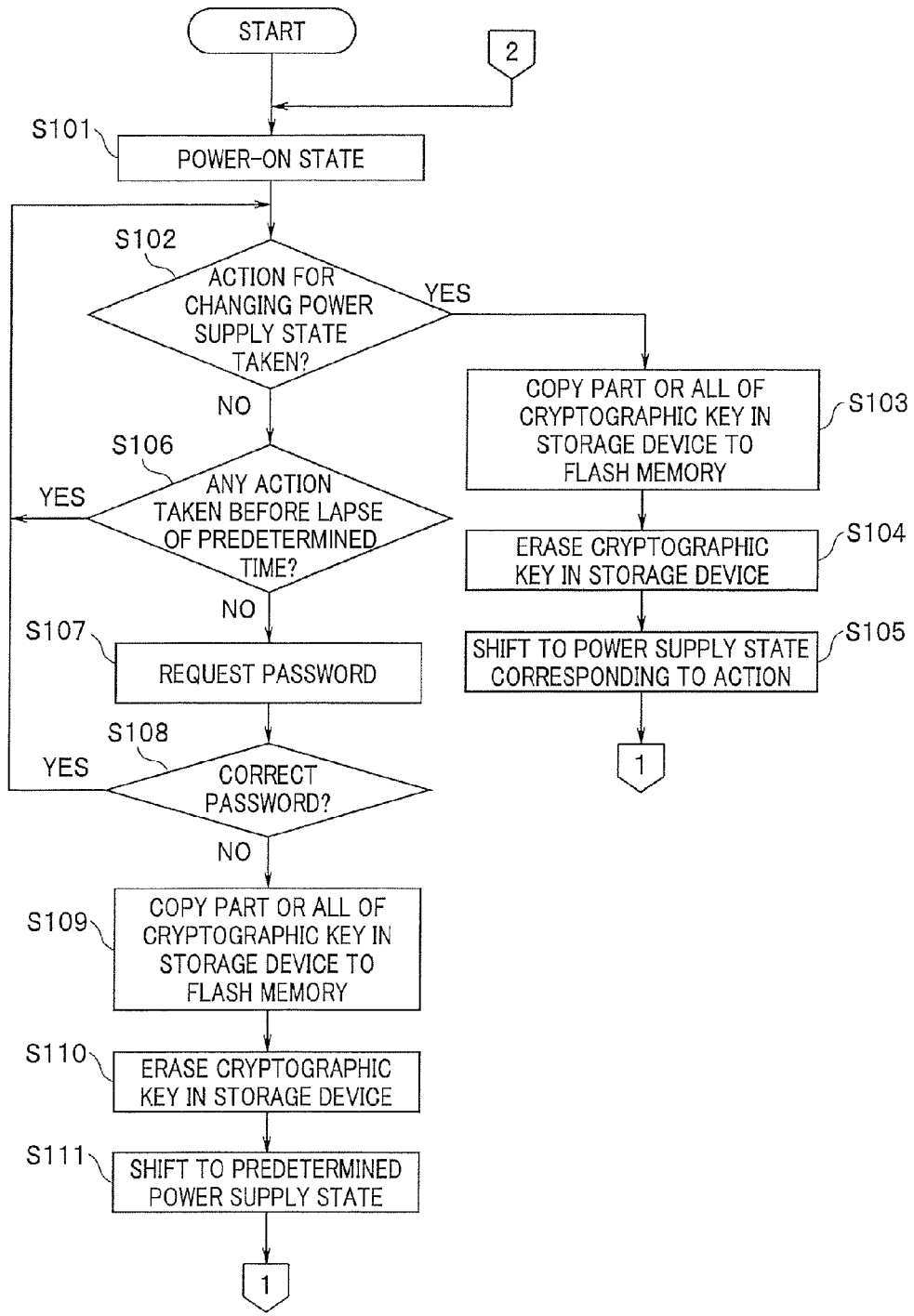
FIG. 2 is a flowchart showing an example of a process performed when a power supply state of the information processing apparatus according to the embodiment shifts from a power-on state to another power supply state different from the power-on state.

FIG. 2 is a flowchart showing an example of a process performed when the power supply state of the information processing apparatus according to the embodiment shifts from a power-on state to another power supply state different from the power-on state.

In a power-on state (Step S101 of FIG. 2) defined as a state in which the OS 22a is running (the data in the storage device 22 can be accessed) and various parts of the information processing apparatus 1 are being supplied with power, the CPU 23 determines whether or not an action for changing the power supply state is taken (using the input device group 27 or the like) (Step S102 of FIG. 2).

Specifically, the CPU 23 functioning as an operator action determination unit determines in Step S102 of FIG. 2 whether or not an action is taken, for example, to power off the information processing apparatus 1, to turn on the suspend function of the information processing apparatus 1, or to turn on the hibernation function of the information processing apparatus 1 (using the input device group 27 or the like).

If it is determined in Step S102 of FIG. 2 that an action for changing the power supply state is taken (using the input device group 27 or the like), the CPU 23 functioning as the cryptographic key movement unit copies M bits ($1 \leq M \leq N$) of the N-bit cryptographic key data stored in the storage device 22 to the flash memory 21 (Step S103 of FIG. 2).

Next, the CPU 23 functioning as the cryptographic key movement unit erases the M bits of cryptographic key data copied to the flash memory 21 in Step S103 of FIG. 2, from the cryptographic key data in the storage device 22 (Step S104 of FIG. 2). Then, the CPU 23 shifts the information processing apparatus 1 to a power supply state corresponding to the action found to have been taken in Step S102 of FIG. 2 (Step S105 of FIG. 2).

Specifically, if it is determined in Step S102 of FIG. 2 that an action is taken, for example, to power off the information processing apparatus 1, the CPU 23 shifts the power supply state of the information processing apparatus 1 from power-on state to power-off state (in which various parts of the information processing apparatus 1 are not supplied with power) in Step S105 of FIG. 2. On the other hand, if it is determined in Step S102 of FIG. 2 that an action is taken, for example, to turn on the suspend function of the information processing apparatus 1, the CPU 23 shifts the power supply state of the information processing apparatus 1 from power-on state to suspended state in Step S105 of FIG. 2. Also, if it is determined in Step S102 of FIG. 2 that an action is taken, for example, to turn on the hibernation function of the information processing apparatus 1, the CPU 23 shifts the power supply state of the information processing apparatus 1 from power-on state to hibernation state in Step S105 of FIG. 2.

On the other hand, if it is determined in Step S102 of FIG. 2 that no action for changing the power supply state is taken (using the input device group 27 or the like), the CPU 23 functioning as the operator action determination unit further determines whether or not any action including an action for changing the power supply state is taken before a lapse of a predetermined time (using the input device group 27 or the like) (Step S106 of FIG. 2).

If it is determined in Step S106 of FIG. 2 that any action is taken before a lapse of the predetermined time (using the input device group 27 or the like), the CPU 23 returns to Step S102 of FIG. 2 to continue processing. On the other hand, if it is determined in Step S106 of FIG. 2 that no action is taken before a lapse of the predetermined time (using the input device group 27 or the like), the CPU 23 causes an image processing circuit (not shown) connected to the main board 24 to display a password input screen on a display device (not shown) such as a monitor, requesting the user to enter a password (Step S107 of FIG. 2).

Subsequently, the CPU 23 functioning as a password input determination unit checks a password entered (by the user) in response to the request in Step S107 of FIG. 2 against password data prestored in the storage device 22 and thereby determines whether or not the entered password is a correct password (Step S108 of FIG. 2).

If it is determined in Step S108 of FIG. 2 that the password entered in response to the request in Step S107 of FIG. 2 is a correct password (matches a password prestored in the storage device 22), the CPU 23 returns to Step S102 of FIG. 2 to continue processing. On the other hand, if it is determined in Step S108 of FIG. 2 that the password entered in response to the request in Step S107 of FIG. 2 is a wrong password (does not match the password prestored in the storage device 22), the CPU 23 functioning as the cryptographic key movement unit copies M bits ($1 \leq M \leq N$) to the flash memory 21 out of the N-bit cryptographic key data stored in the storage device 22 (Step S109 of FIG. 2).

Incidentally, in a password determination process in Step S108 of FIG. 2, the CPU 23 may move to the process in Step S109 of FIG. 2 when it is determined multiple times (two or three times) consecutively that the password entered in response to the request in Step S107 of FIG. 2 is a wrong password rather than when it is determined once that the password entered in response to the request in Step S107 of FIG. 2 is a wrong password.

The CPU 23 functioning as the cryptographic key movement unit erases the M bits of cryptographic key data copied to the flash memory 21 in Step S109 of FIG. 2, from the cryptographic key data in the storage device 22 (Step S110 of FIG. 2), and then shifts the power supply state of the information processing apparatus 1 from the power-on state to a predetermined power supply state (Step S111 of FIG. 2). The predetermined power supply state may be any one of the power-off state, the suspended state, and the hibernation state.

Figure 3:
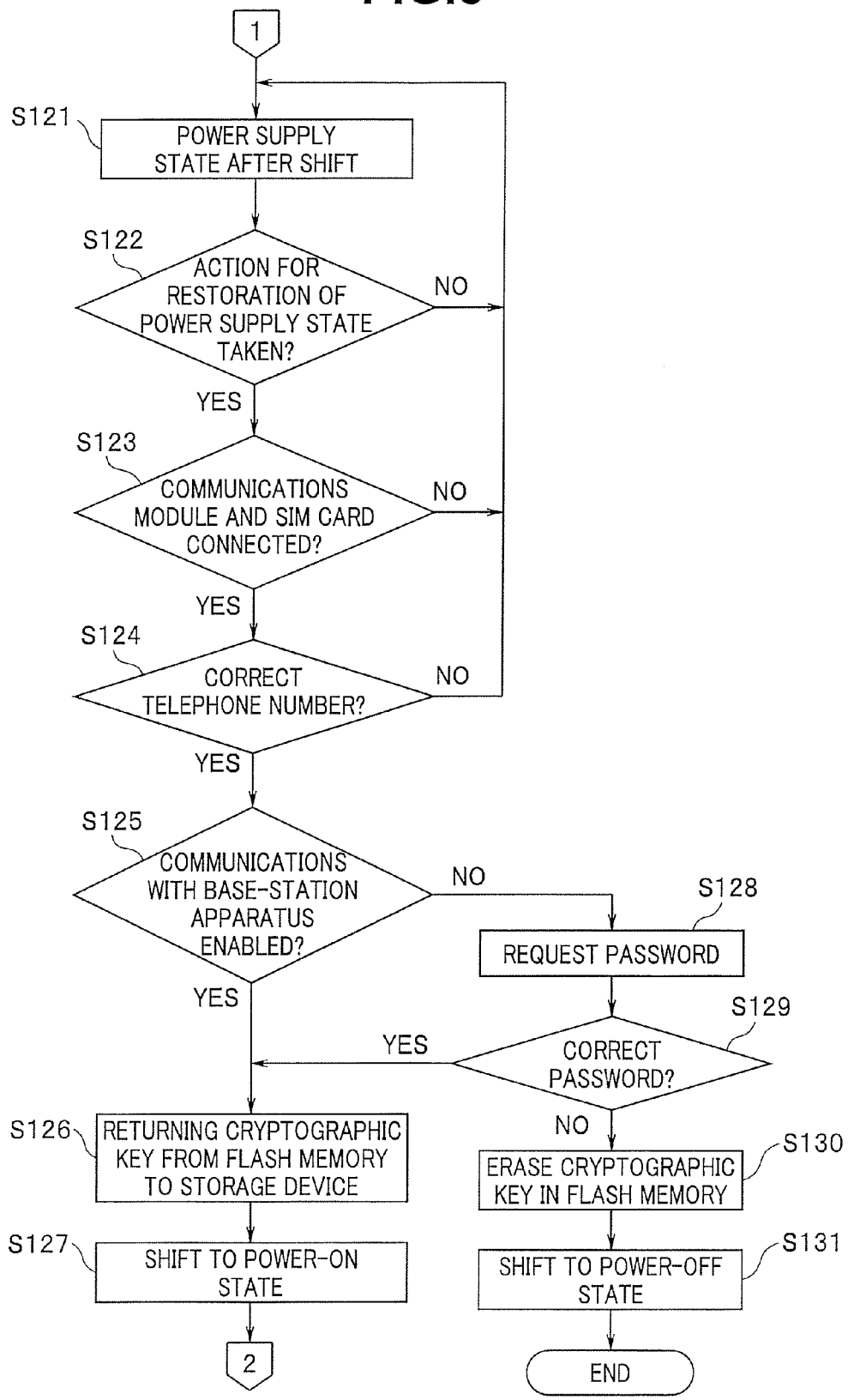
FIG. 3 is a flowchart showing an example of a process performed when the power supply state of the information processing apparatus according to the embodiment is other than the power-on state.

FIG. 3 is a flowchart showing an example of a process performed when the power supply state of the information processing apparatus according to the embodiment is other than the power-on state.

The power supply state (Step S121 of FIG. 3) of the information processing apparatus 1 resulting from a process in Step S105 or Step S111 of FIG. 2 is maintained until an action for restoration of the power supply state of the information processing apparatus 1 is taken (using the input device group 27 or the like) (Step S122 of FIG. 3).

Specifically, for example, the power supply state of the information processing apparatus 1 is maintained in a power-off state until an action is taken to power on the information processing apparatus 1. Also, for example, the power supply state of the information processing apparatus 1 is maintained in a suspended state until an action is taken to turn off the suspend function. Also, for example, the power supply state of the information processing apparatus 1 is maintained in a hibernation state until an action is taken to turn off the hibernation function.

When an action for restoration of the power supply state of the information processing apparatus 1 is taken (using the input device group 27 or the like) (Step S122 of FIG. 3), operation of the CPU 23 is started.

Upon activation in response to an action for restoration of the power supply state of the information processing apparatus 1, the CPU 23 determines whether or not the communications module 25 and the SIM card 26 are connected (mounted) (Step S123 of FIG. 3).

If it is determined in Step S123 of FIG. 3 that the communications module 25 is not connected to (mounted on) the main board 24 or that the SIM card 26 is not connected to (mounted on) the communications module 25, the CPU 23 performs control to maintain the information processing apparatus 1 in the power supply state existing in Step S121 of FIG. 3 (power-off state, suspended state, or hibernation state). If it is determined in Step S123 of FIG. 3 that the communications module 25 is connected to (mounted on) the main board 24 and that the SIM card 26 is connected to (mounted on) the communications module 25, the CPU 23 further checks the telephone number data written in the SIM card 26 against the telephone number data prestored in the flash memory 21 and thereby determines whether or not the telephone number in the SIM card 26 is a correct telephone number (whether or not a telephone number matching a telephone number contained in the identification data prestored in the flash memory 21 is entered) (Step S124 of FIG. 3).

If it is determined in Step S124 of FIG. 3 that the telephone number written in the SIM card 26 is a wrong telephone number (a telephone number not matching the telephone number contained in the identification data prestored in the flash memory 21 has been entered), the CPU 23 performs control to maintain the information processing apparatus 1 in the power supply state existing in Step S121 of FIG. 3 (power-off state, suspended state, or hibernation state). On the other hand, if it is determined in Step S124 of FIG. 3 that the telephone number written in the SIM card 26 is a correct telephone number (a telephone number matching the telephone number contained in the identification data prestored in the flash memory 21 has been entered), the CPU 23 functioning as the communications state determination unit further determines whether or not communications are enabled between the communications module 25 and the base-station apparatus outside the information processing apparatus 1 by operating the communications module 25 (Step S125 of FIG. 3).

If it is determined in Step S125 of FIG. 3 that communications are enabled between the communications module 25 and the base-station apparatus outside the information processing apparatus 1 (that the communications module 25 is within communications range) or if a positive decision is made in Step S129 of FIG. 3 (described later), the CPU 23 functioning as the cryptographic key control unit enables access to the data in the storage device 22 (Step S126 of FIG. 3) by returning the M bits of cryptographic key data from the flash memory 21 to the storage device 22, and then shifts the power supply state of the information processing apparatus 1 to a power-on state (Step S127 of FIG. 3). On the other hand, if it is determined in Step S125 of FIG. 3 that communications are disabled between the communications module 25 and the base-station apparatus outside the information processing apparatus 1 (that the communications module 25 is outside communications range), the CPU 23 causes the image processing circuit (not shown) connected to the main board 24 to display a password input screen on a display device (not shown) such as a monitor, requesting the user to enter a password (Step S128 of FIG. 3).

Subsequently, the CPU 23 functioning as the password input determination unit checks a password entered (by the user) in response to the request in Step S128 of FIG. 3 against password data prestored in the flash memory 21 and thereby determines whether or not the entered password is a correct password (Step S129 of FIG. 3).

If it is determined in Step S129 of FIG. 3 that the password entered in response to the request in Step S128 of FIG. 3 is a correct password (matches a password prestored in the flash memory 21), the CPU 23 returns to Step S126 and Step S127 of FIG. 3 to continue processing. On the other hand, if it is determined in Step S129 of FIG. 3 that the password entered in response to the request in Step S128 of FIG. 3 is a wrong password (does not match a password prestored in the flash memory 21), the CPU 23 erases the M bits of cryptographic key data stored in the flash memory 21 (Step S130 of FIG. 3), and then forcibly shifts the power supply state of the information processing apparatus 1 to a power-off state (Step S131 of FIG. 3) regardless of the power supply state in Step S121 of FIG. 3.

Specifically, for example, if the power supply state in Step S121 of FIG. 3 is a power-off state, the power-off state is maintained forcibly by a process in Step S131 of FIG. 3. Also, for example, if the power supply state in Step S121 of FIG. 3 is a suspended state or a hibernation state, the power supply state is shifted forcibly to a power-off state by the process in Step S131 of FIG. 3.

That is, after the process in Step S131 of FIG. 3, complete cryptographic key data is not left in either the flash memory 21 or storage device 22. Thus, after the process in Step S131 of FIG. 3, even if an action is taken to power on the information processing apparatus 1 (using the input device group 27 or the like), the data in the storage device 22 cannot be accessed and consequently the data in the storage device 22 is protected.

Incidentally, in a password determination process in Step S129 of FIG. 3, the CPU 23 may move to the process in Step S130 of FIG. 3 when it is determined multiple times (two or three times) consecutively that the password entered in response to the request in Step S128 of FIG. 3 is a wrong password rather than when it is determined once that the password entered in response to the request in Step S128 of FIG. 3 is a wrong password.

In the embodiment described above, when the communications module 25 and the SIM card 26 are connected to the main board 24 of the information processing apparatus 1, the telephone number in the SIM card 26 matches the telephone number in the flash memory 21, and communications are enabled between the communications module 25 and the base-station apparatus outside the information processing apparatus 1, cryptographic key data is restored to enable access to the data in the encrypted storage device 22.

Also, in the embodiment described above, when the communications module 25 and the SIM card 26 are connected to the main board 24 of the information processing apparatus 1, the telephone number in the SIM card 26 matches the telephone number in the flash memory 21, and communications are disabled between the communications module 25 and the base-station apparatus outside the information processing apparatus 1, if a password different from the password prestored in the flash memory 21 is entered, restoration of the cryptographic key data used to allow access to the data in the encrypted storage device 22 is disabled by completely erasing the M bits of cryptographic key data stored in the flash memory 21.

Thus, for example, when the information processing apparatus 1 is transferred to a location where communications with the outside are disabled or when the storage device 22 is removed from the information processing apparatus 1, the embodiment described above can prevent access to the data in the storage device 22, i.e., prevent data leakage more reliably than conventional techniques.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing apparatus comprising:
a first storage unit configured to prestore an operating system and subjected to an encryption process in advance using cryptographic key data;
a second storage unit configured to prestore identification data including information used to identify users allowed to access the first storage unit;
a power supply state control unit configured to perform control to shift a power supply state from a first state to a second state, the first state being a power-on state in which the operating system is running and the second state being a power supply state different than the first state;
a cryptographic key movement unit configured to move at least part of the cryptographic key data stored in the first storage unit to the second storage unit before the power supply state control unit shifts from the first state to the second power supply state;
a communications unit configured to be able to conduct wireless communications with a base-station apparatus installed outside the cryptographic key movement unit;
a communications state determination unit configured to determine in the second power supply state whether communications are enabled between the communications unit and the base-station apparatus;
a password input determination unit configured to determine whether a password which matches a password prestored in the second storage unit is entered in a password input screen displayed when the communications state determination unit determines that communications are disabled between the communications unit and the base-station apparatus; and
a cryptographic key control unit configured to:
return the at least part of the cryptographic key data from the second storage unit to the first storage unit when (i) a determination is made that there is an input of information which matches the information included in the identification data stored in the second storage unit and the communications state determination unit determines that communications are enabled between the communications unit and the base-station apparatus, or (ii) the password input determination unit determines that a password which matches the password prestored in the second storage unit is entered, and
erase the at least part of the cryptographic key data moved to the second storage unit when the password input determination unit determines that a password which does not match the password prestored in the second storage unit is entered one or more times, wherein the power supply state control unit forcibly shifts the power supply state of the information processing apparatus to a power-off state after the erasing of the at least part of the cryptographic key data by the cryptographic key control unit.

2. The information processing apparatus according to claim 1, further comprising an operator action determination unit configured to determine whether any action including an action to shift from the first state to the second power supply state is taken before a lapse of a predetermined time,
wherein the password input determination unit determines whether a password which matches a password prestored in the first storage unit is entered in a password input screen displayed when the operator action determination unit determines that no action is taken before a lapse of the predetermined time; and
the cryptographic key movement unit moves at least part of the cryptographic key data stored in the first storage unit to the second storage unit when the password input determination unit determines that a password which does not match the password prestored in the first storage unit is entered one or more times.

3. A data protection method in an information processing apparatus comprising:
power supply state control performing control to shift a power supply state of from a first state to a second state, the first state being a first state in which an operating system is running in the information processing apparatus and the second power supply state being different than the first state;

cryptographic key movement moving at least part of cryptographic key data stored in a first storage unit to a second storage unit before the power supply state control shifts from the first state to the second power supply state, where the first storage unit is configured to prestore the operating system and subjected to an encryption process in advance using the cryptographic key data and the second storage unit is configured to prestore identification data including information used to identify users allowed to access the first storage unit;

information input determination determining in the second power supply state whether there is an input of information which matches the information included in the identification data stored in the second storage unit;

communications state determination determining in the second power supply state whether communications are enabled between a communications unit and a base-station apparatus, where the communications unit is configured to be able to conduct wireless communications with the base-station apparatus;

password input determination determining whether a password which matches a password prestored in the second storage unit is entered in a password input screen displayed when the communications state determination determines that communications are disabled between the communications unit and the base-station apparatus; and cryptographic key control:

returning the at least part of the cryptographic key data from the second storage unit to the first storage unit when (i) the information input determination determines that there is an input of information which matches the information included in the identification data stored in the second storage unit and the communications state determination determines that communications are enabled between the communications unit and the base-station apparatus, or (ii) the password input determination determines that a password which matches the password prestored in the second storage unit is entered, and erasing the at least part of the cryptographic key data moved to the second storage unit when the password input determination determines that a password which does not match the password prestored in the second storage unit is entered one or more times, wherein the power supply state control forcibly shifts the power supply state of the information processing apparatus to a power-off state after the erasing of the at least part of the cryptographic key data by the cryptographic key control.

4. The data protection method according to claim 3 further comprising operator action determination determining whether any action including an action to shift from the first state to the second power supply state is taken before a lapse of a predetermined time, wherein the password input determination determines whether a password which matches a password prestored in the first storage unit is entered in a password input screen displayed when the operator action determination determines that no action is taken before a lapse of the predetermined time; and the cryptographic key movement moves at least part of the cryptographic key data stored in the first storage unit to the second storage unit when the password input determination determines that a password which does not match the password prestored in the first storage unit is entered one or more times.

* * * * *